United States Patent [19]

Cockroft

[11] Patent Number: 5,287,217

[45] Date of Patent: Feb. 15, 1994

[54] OPTICAL AMPLIFICATION AT THE 1.31 WAVELENGTH

[75] Inventor: Nigel J. Cockroft, Los Alamos, N. Mex.

[73] Assignee: The United States of America as represented by the United States Department of Energy, Washington, D.C.

[21] Appl. No.: 39,676

[22] Filed: Mar. 30, 1993

[51] Int. Cl.$^5$ .............................. H01S 3/17
[52] U.S. Cl. .................... 359/341; 359/343
[58] Field of Search ............ 372/6, 39, 40; 359/341, 359/343

[56] References Cited

U.S. PATENT DOCUMENTS

| 5,084,890 | 1/1992 | Brierley | 372/40 |
| 5,140,658 | 8/1992 | Sunshine | 372/40 |
| 5,185,847 | 2/1993 | Fevrier et al. | 372/40 X |

Primary Examiner—Mark Hellner
Attorney, Agent, or Firm—Milton D. Wyrick; William A. Eklund; William R. Moser

[57] ABSTRACT

An optical amplifier operating at the 1.31 μm wavelength for use in such applications as telecommunications, cable television, and computer systems. An optical fiber or other waveguide device is doped with both $Tm^{3+}$ and $Pr^{3+}$ ions. When pumped by a diode laser operating at a wavelength of 785 nm, energy is transferred from the $Tm^{3+}$ ions to the $Pr^{3+}$ ions, causing the $Pr^{3+}$ ions to amplify at a wavelength of 1.31

6 Claims, 1 Drawing Sheet

OPTICAL AMPLIFICATION AT THE 1.31 WAVELENGTH the invention is a result of a contract with the Department of Energy (Contract No. W-7405-ENG-36).

BACKGROUND OF THE INVENTION

The present invention generally relates to amplification of optical signals in optical fibers and other waveguide devices, and, more specifically, to amplification of light signals at a wavelength of 1.31 μm.

Currently, optical fibers are being installed throughout the world for communication purposes. Where long distances must be traversed, as with trans-oceanic cables, it is a common problem to minimize the number of active amplifiers for the line. It is for this reason that most long distance telecommunication lines are operated at a wavelength of 1.55 μm. At this wavelength, attenuation in signals in silica optical fiber is reduced, allowing for the use of fewer amplifiers per unit of distance. Erbium-doped optical fiber amplifiers which recently have been developed are sufficiently efficient and small enough for telecommunication applications. However, 1.55 μm wavelength systems do suffer from relatively high signal dispersion, which results in temporal broadening of the light pulses.

In contrast, signal dispersion at 1.31 μm wavelength in silica optical fibers is much improved, so that signals can be transmitted at the greatest temporal rate, making it also attractive for local area computer networks, subscriber cable television networks, and high-speed computing networks. Unfortunately, there has been little success in the development of practical 1.31 μm wavelength optical amplifiers.

Because of the benefits of the 1.31 μm wavelength, systems utilizing that wavelength have been installed by most telecommunication industries in the United States and in the United Kingdom. For amplification, these systems use a hybrid opto/electronic regenerator which decodes the optical information with sensors and uses electronics to command LEDs or lasers to retransmit the information down the next section of optical fiber. These regeneration systems are complex, bulky and costly, and have a much lower level of efficiency, reliability and capacity than is desired for modern communication systems.

Work on more practical optical amplifiers for the 1.31 μm wavelength has been proceeding for some time without a great deal of success. Amplifiers for this wavelength have been demonstrated in the laboratory, but have not proven to be downscable to the size necessary for telecommunication applications. In doing this work, however, it has been recognized that proper doping of the optical fibers can tailor fibers to amplify at a desired length. For example, Praseodymium ions ($Pr^{+3}$) have been used with limited success to dope standard ZBLAN ® (fluoro-zirconate) fiber glass. The major problem with this fiber is that it must be pumped at a wavelength of 1.02 μm, a wavelength for which no economically feasible high-power diode laser currently exists.

Other work has shown that Ytterbium ions ($Yb^{3+}$) can be added as a codopant with $Pr^{3+}$ to provide energy transfer with $Pr^{3+}$. This system can be pumped at 890 nm, a reasonable diode laser wavelength, and energy is transferred to the $Pr^{3+}$ ions to provide gain at 1.31 μm. Regrettably, this system has not proven to be as successful as hoped because of inefficiency of the energy transfer between the dopants, and because of problems with the energy absorption of the $Yb^{3+}$ ions at this wavelength.

It is therefore an object of the present invention to provide practical apparatus for the amplification of signals at the 1.31 μm wavelength.

It is another object of the present invention to provide a 1.31 μm amplification system which can be pumped by readily available lasers.

Additional objects, advantages and novel features of the invention will be set forth in part in the description which follows, and in part will become apparent to those skilled in the art upon examination of the following or may be learned by practice of the invention. The objects and advantages o the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises an optical fiber doped with $Tm^{3+}$ ions nd $Pr^{3+}$ ions, and laser means for pumping the $Tm^{3+}$ ions at a wavelength of approximately 785 nm; wherein the $Tm^{3+}$ ions transfer energy to the $Pr^{3+}$ ions, which amplify signals at the 1.31 μm wavelength.

In a further aspect of the present invention, and in accordance with its objects and purposes an amplifier for a 31 μm wavelength comprises an optical waveguide in a planar or channel configuration having inside and outside surfaces with a thin layer of glass or crystalline material doped with $Tm^{3+}$ ions and $Pr^{3+}$ ions on the inside surfaces of said optical waveguide. Laser means pump the $Tm^{3+}$ ions at a wavelength of approximately 785 nm;

In a still further aspect of the present invention, and in accordance with its objects and purposes, a method of amplifying signals at a wavelength of 1.31 μm comprises the steps of doping a substrate with $Tm^{3+}$ ions and $Pr^{3+}$ ions and pumping said $Tm^{3+}$ ions with a diode laser operating at a wavelength of approximately 785 nm; wherein the $Pr^{3+}$ ions amplify the signals having a wavelength of 1.31 μm.

BRIEF DESCRIPTION OF THE DRAWINGS

The accompanying drawing, which is incorporated in and forms a part of the specification, illustrate the embodiments of the present invention and, together with the description, serve to explain the principles of the invention. In the drawing.

DETAILED DESCRIPTION

Figure 1:
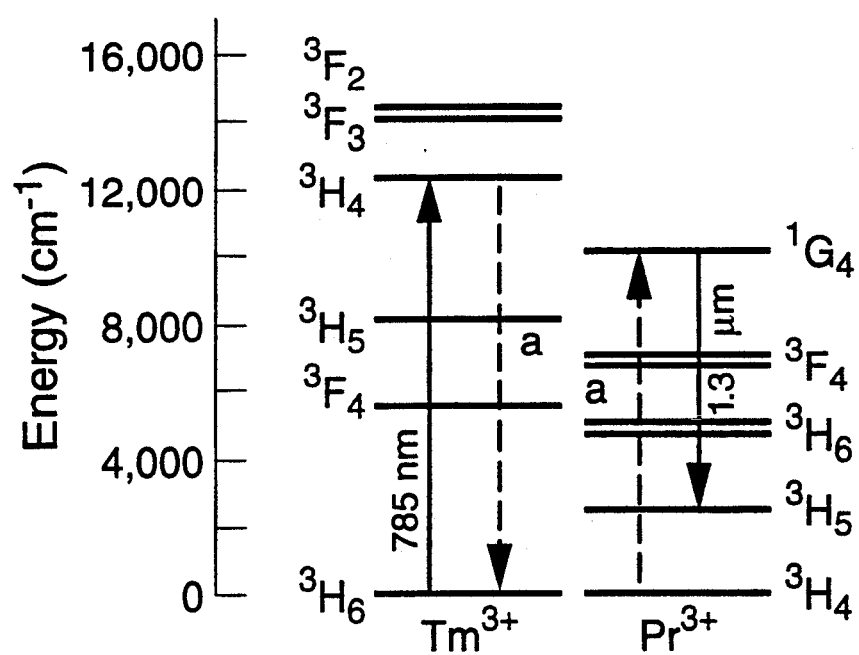
FIG. 1 is an energy diagram illustrating energy states and transitions in $Tm^{3+}$ and $Pr^{3+}$ ions with pumping at 785 nm.

The present invention provides a 1.31 μm wavelength amplification system by optimizing the doping of a substrate such as a heavy metal glass fiber or an optical waveguide to provide for enhanced energy absorption and transfer. The invention also provides for pumping at a wavelength of 785 nm, a wavelength at which the well developed GaAlAs diode laser operates extremely well.

To develop the invention, it was necessary to investigate the properties of other possible dopants. This investigation led to a test in another project in which Thulium ions ($Tm^{3+}$) were excited at 791 nm, and visible emission was noted from the $Pr^3$ ions doped in the same crystal. This result, and subsequent investigation, in turn, led to the conclusion that this energy transfer mechanism might be the cornerstone of a practical 1.31 $\mu$m wavelength fiber amplifier.

Presently, most optical fiber systems utilize optical fibers of a silica composition, for which wavelengths of 1.31 $\mu$m and 1.55 $\mu$m are of particular significance. At the 1.55 $\mu$m wavelength, there is low signal attenuation. However, dispersion in silica optical fibers is minimized with 1.31 $\mu$m wavelength signals. It is for this, and other reasons, that the present invention provides a suitable and useful optical fiber amplifier.

In the invention, it has been found that the $Tm^{3+}/Pr^{3+}$ ion dopant combination can be optimized in heavy metal glasses, such as ZBLAN®, or other low-phonon glass optical fibers to preferentially populate the $Pr^{3+}$ ion energy level which is required for 1.31 $\mu$m wavelength amplification by pumping the $Tm^{+3}$ with a GaAlAs diode laser. The optimized codoping of the present invention is expected to yield an energy transfer rate superior to the $Pr^{3+}/Yb^{3+}$ ion codopants of the prior art.

The operation of the invention involves using a small GaAlAs diode laser to pump the $Tm^{3+}$ ions, which, in turn, transfer energy to the $Pr^{3+}$ ions for amplification at 1.31 $\mu$m wavelength. In FIG. 1, an energy diagram is illustrated which shows that the $^3H_6$ to $^3H_4$ Tm transition may be excited with a near infrared (approximately 785 nm) semiconductor diode laser. As seen in FIG. 1, this energy is then transferred by non-radiative coupling of neighboring ions, by way of step a, to populate the $^1G_4$ level of the Pr ions. The transition from $^1G_4$ to $^3H_5$ provides the desired 1.31 $\mu$m wavelength amplification.

Although the present invention lends itself to fiber optics, it is certainly not limited to that application. It should be clear that the key to the advance in the state-of-the-art of 1.31 $\mu$m wavelength amplification presented by the invention is the use of the $Tm^{+3}/Pr^{+3}$ ion combination. This ion combination can also be applied to optical waveguide technology in which the $Tm^{+3}/Pr^{+3}$ ion co-doping may be used in anticipated amplifier configurations that use planar or channel construction. In these devices, the propagating light is confined to the small ($<6$ $\mu$m) dimensions of the optically active $Tm^{+3}/Pr^{+3}$ doped glass or crystalline media. These devices also will be excited by GaAlAs diode lasers, operating at approximately 785 nm, and will amplify signals at the 1.31 $\mu$m wavelength The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An amplifier for a 1.31 $\mu$m wavelength comprising:
    an optical fiber doped with $Tm^{3+}$ ions and $Pr^{3+}$ ions; and
    laser means for pumping said $Tm^{3+}$ ions at a wavelength of approximately 785 nm;
    wherein said $Tm^{3+}$ ions transfer energy to said $Pr^{3+}$ ions which amplify signals at said 1.31 $\mu$m wavelength.

2. The apparatus as described in claim 1, wherein said optical fiber comprises a heavy metal glass.

3. The apparatus as described in claim 1, wherein said heavy metal glass comprises ZBLAN® fiber glass.

4. An amplifier for a 1.31 $\mu$m wavelength comprising:
    an optical waveguide in a planar or channel configuration having inside and outside surfaces;
    a thin layer of glass or crystalline material doped with $Tm^{3+}$ ions and $Pr^{3+}$ ions on said inside surfaces of said optical waveguide; and
    laser means for dumping said $Tm^{3+}$ ions at a wavelength of approximately 785 nm.

5. The apparatus as described in claim 1, wherein said laser means comprises a GaAlAs diode laser operating at a wavelength of approximately 785 nm.

6. A method of amplifying signals having a wavelength of 1.31 $\mu$m comprising the steps of:
    doping a substrate with $Tm^{3+}$ ions and $Pr^{3+}$ ions;
    pumping said $Tm^{3+}$ ions with a diode laser operating at a wavelength of approximately 785 nm;
    wherein said $Pr^{3+}$ ions amplify said signals having a wavelength of 1.31 $\mu$m.

* * * * *